United States Patent [19]
Olsson

[11] 3,869,565
[45] *Mar. 4, 1975

[54] PICTURE GENERATING UNIT OF SCANNING TYPE

[75] Inventor: Tore Bertil Reinhold Olsson, Karlskoga, Sweden

[73] Assignee: Aktiebolaget Bofors, Bofors, Sweden

[ * ] Notice: The portion of the term of this patent subsequent to Mar. 4, 1991, has been disclaimed.

[22] Filed: Mar. 17, 1971

[21] Appl. No.: 125,126

[30] Foreign Application Priority Data

Mar. 26, 1970 Sweden .............................. 4273/70

[52] U.S. Cl........ 178/6.8, 178/DIG. 8, 178/DIG. 34, 178/DIG. 37, 250/333

[51] Int. Cl. ............................................ H04n 5/19

[58] Field of Search. 178/DIG. 8, DIG. 37, DIG. 34, 178/6.8; 250/333

[56] References Cited

UNITED STATES PATENTS

| | | | |
|---|---|---|---|
| 3,579,249 | 5/1971 | Dewey et al. | 178/DIG. 37 |
| 3,581,109 | 5/1971 | Olsson et al. | 178/DIG. 8 |
| 3,591,713 | 7/1971 | Olsson et al. | 178/DIG. 8 |
| 3,597,534 | 8/1971 | Lidingo | 178/DIG. 8 |

*Primary Examiner*—Howard W. Britton
*Attorney, Agent, or Firm*—Hane, Baxley & Spiecens

[57] ABSTRACT

A scanning device such as an IR camera generates horizontal and vertical scanning signals to direct a detector over a viewing field. The detector then emits information signals in accordance with the amplitude of a property, such as temperature, at points within the viewing field. The information signals are fed via a video channel to a display device to give a visual indication of the temperature distribution of the viewing field. In addition a selective device through the agency of the scanning signals controllably selects a portion of the viewing field for detailed study. The selective device feeds signals to the display device to visually demarcate the selected area and also selects the information signals in that area for amplitude measurement. The measure of the amplitude is converted to a form suitable to control the black level of information signals passing through the video channel.

10 Claims, 7 Drawing Figures

SIGNAL PROCESSING UNIT 13

PICTURE GENERATING UNIT OF SCANNING TYPE

The present invention relates to a picture generating unit of the scanning type, utilizing a first signal (video signal) which varies with the intensity of the radiation from the individual points in a scanned field of view and in which additional signals give information about the scanning position or give information about points in the scanning process, and in which signal-processing circuits for the first signal contain members which determine an amplitude level below which the first signal is to be represented with black (with white if the picture is inverted) on a picture obtained from the display part of the picture generating unit or with white in case the picture generating unit is provided with devices for inverting the picture. As an example of points in the scanning process can be mentioned those in which trigger signals to vertical and horizontal sweeps, respectively, are obtained in certain types of picture generating units, and as an example of a picture generating unit of the type to which reference is made here can be mentioned the so-called IR cameras, in which conversion of the radiation into a video signal takes place in a single element or multi-element detector and in which information about the scanning position can be obtained also from the voltages that deflect the ray modulated by the video signal or the rays in the picture tube synchronously with the scanning.

Since the invention is particularly useful with an IR camera, for the sake of simplicity it will be dealt with on the basis of such a camera which has a conventional video channel, but this limitation in the description does not in any way exclude its use for other types of IR cameras or scanning units. Thus, in FIG. 1, a conventional video channel can contain a pre-amplifier 1 which is connected to the detector of the IR camera, as well as to a measuring range selector 2 with which it is possible to set the measuring range that corresponds to the temperature variations that occur in the depicted object. The video channel in the example of the embodiment also has an intermediate amplifier 3 and an output amplifier 4, of which the latter is connected to an intensity controlling grid in the display device of the camera, which is then also arranged to reproduce a video signal, or portions thereof which for instance exceeds a predetermined value on the picture screen. On the other hand, the video signal, or parts thereof, which do not have the predetermined value will be represented with black in the picture (or with white of the camera is provided with a picture inverter and this is connected). In a subtracting device 5, which is connected between the amplifiers 3 and 4, a voltage is subtracted from the video signal, the level of which is determined manually by means of a control member 6, so that the video signal is given an increase or decrease in potential. It is thereby possible, by means of control member 6, to select the amplitude level below which the video signal is to be represented with black in the picture. Between subtracting device 5 and the output amplifier 4 a contrast control 7 is also applied, with which control the range of the grey tone picture can be varied, i.e. the amplitude of the video signal thus processed which is fed to the intensity controlling grid in the display part can be varied (finely adjusted). From the viewpoint of the picture obtained, the control member 6 is thus a black level control, with the aid of which the grey scale is displaced upwards or downwards within the temperature range that has been set, i.e. upwards or downwards on the video signal. If the black level is set high, the parts remaining above the black level can be reproduced with for instance only a few of the grey scale shades, while for a displacement downwards of the black level, the remaining parts will be shown with more and more of the shades of the scale, the more the displacement. If the displacement downwards continues also after all of the shades have become visible, the parts of the video signal which are located above the grey scale will be reproduced with white in the picture. A typical combination of an IR camera, a video channel and a display device are shown in FIG. 3 on page 3 of the article entitled "A Wide-Angle Infra-Red camera for Industry" in Industrial Electronics, Nov. 1968.

The above-mentioned construction, in principle, of the video channel, involves for some fields of application of the IR camera subjective evaluations when setting the picture which can have a detrimental influence on the result obtained for a measurement made with the IR camera. As an example of this can be mentioned mass examinations of subjects of which the temperatures deviate from each other, for instance examinations of breast cancer, in which the skin temperatures of the patients vary. In such examinations the grey tone picture obtained on the picture screen is photographed and documented, for subsequent examination by specialists, for analyses. The operator must then, for each measurement, in order that the correct temperature range be reproduced, displace the grey tone picture manually with the aid of the black level control, while watching and judging the picture. If, for instance, the setting is to be made according to the warmest point in the most interesting part of the picture area, it can be advisable to allow the white limit field of the grey scale to represent such warmest point, and it is then important that the white limit field has its correct size in the different measurements.

However, it has proved, inter alia, owing to certain non-lineorities in the picture tube, that there are great difficulties involved in setting the white limit field uniformly. If it is moreover necessary to adjust the picture according to a point which is below the warmest point, it will become still more difficult to make the correct setting, as a judgement must then be made according to the distribution of the white areas.

Through training, a skilled operator can attain acceptable results for measurements that are carried out in immediate succession. But for measurements that take place at different times, as well as for measurements carried out by different operators, it is very doubtful whether the documentation obtained can serve as a suitable basis for the analysis in question.

The purpose of the present invention is, inter alia, to solve the above-mentioned problems, and the invention is substantially characterized in that the picture generating unit contains a selective device for sensing said additional (scan) signals. The device is arranged to reproduce the first signal in at least one area located in the field of view and is connected to a signal-processing unit in which the first signal reproduced from said area causes an output signal to be transmitted from the unit in that the signal-processing unit is then connected to a member for determining said black level or if the picture is inverted to determine the white level. This member is actuated directly or indirectly by the output signal so that this signal influences the black level or the white level, respectively, in the picture obtained.

A device embodying the invention will be described in the following, with reference to the attached drawings, in which.

Figure 1:
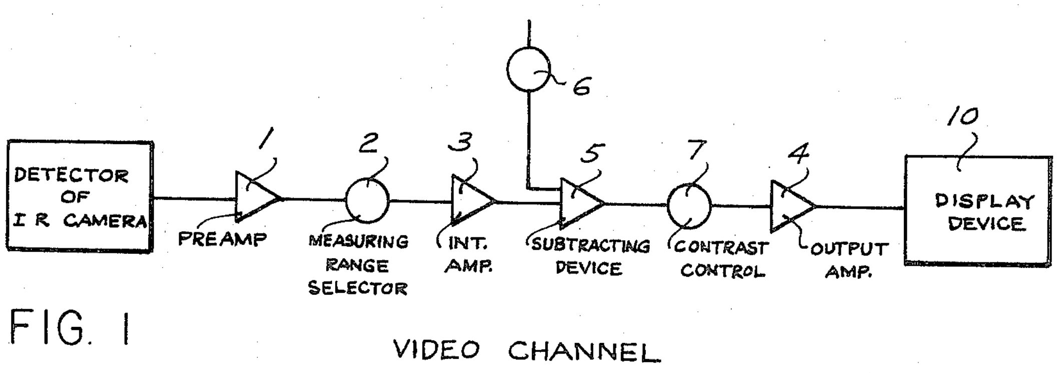
FIG. 1 shows an example of the schematic embodiment of a conventional video channel of an IR camera.
Figure 2:
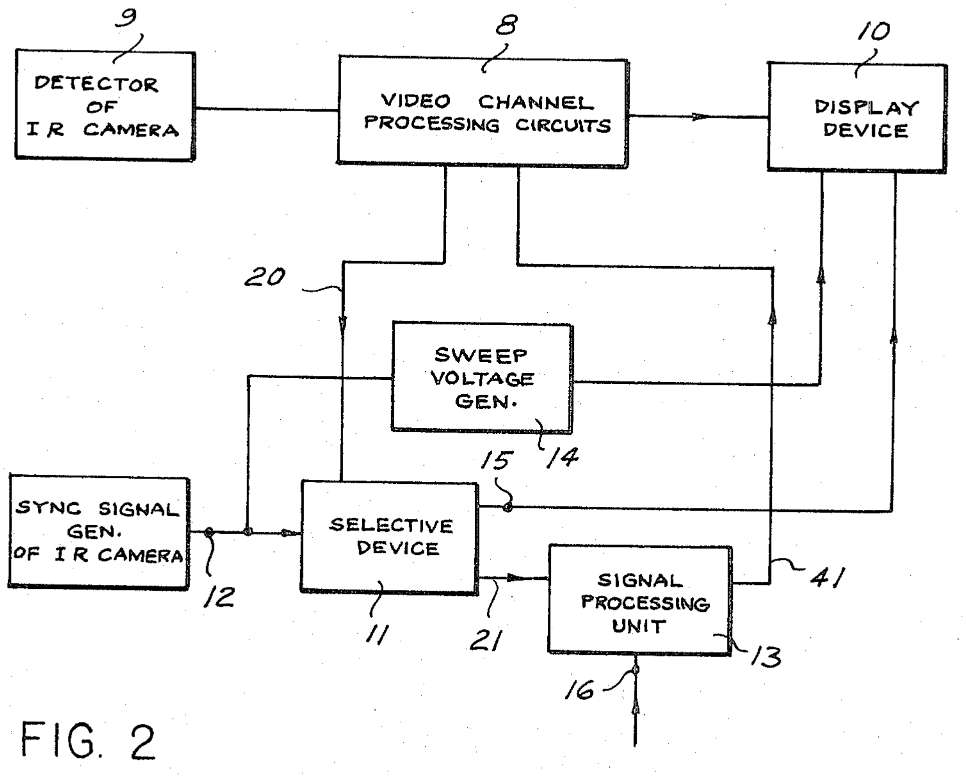
FIG. 2 shows a system for the application of a device according to the invention in an IR camera.

Signal-processing circuits (video channel) for the first (video) signal, resembling the circuits shown in FIG. 1 are designated 8 in FIG. 2, said circuits 8 in FIG. 2 then being assumed to contain members for determining the black level (of the subtracting device 5 with the corresponding black level control 6). The first signal is fed to said circuits 8 from a detector of an IR camera via a first connection point 9, while the circuits 8 are also connected with a display device 10 in which the processed video signal is applied on an intensity controlling grid of a picture tube (CRT) of the display part. The combination of the IR camera, video channel processing circuits 8 and display device 10 are shown in the above-cited article A selective device 11 hereinafter more fully described is connected to the signal-processing circuits at an appropriate place in order to provide for reproduction of the first signal in at least one area of the field of view scanned by the camera indicated by the selective device 11. The indication takes place with the aid of the additional signals (trigger or sync signals) which give information about positions in the scanning process of the camera. These additional signals are fed to the selective device via a second connection point 12. The selective device, in turn, is also connected to a signal-processing unit 13, in which the first signal, reproduced in the selective device, for instance through scanning, reproduction or separation, causes a signal to be transmitted from the unit 13, which signal is then given a characteristic so that it represents the reproduced first signal. The signal-processing unit 13 is also connected to the signal-processing circuits 8 at their members for determining the black level, which are actuated directly or indirectly by the output signal so that this actuates the black level in the picture obtained.

FIG. 2 also shows conventional horizontal and vertical sweep circuits 14 which generate sweep voltages for the picture tube, which circuits are controlled by the additional signals from the second connection point 12. Via an output 15 on the selective device 11, the display part 10 receives information about the area indicated by the device in the field of view, which provides for indication of the selected area in or at the picture. The display part receives this information for instance in that the signal from 15 is either added to the intensity controlling grids in the picture tube or to an appropriate place in the circuits 8. It is then appropriate to allow the signal from output 15 to pass a device, not shown, which can be actuated manually, which permits connection and disconnection of the indication in or at the picture. Finally, the signal-processing unit can be set at zero for a signal via a third connection point 16 for instance for each new measurement.

The selective device 11 can be made in such a way that said area will have a fixed location, but since additional substantial advantages are gained by having an area than can be moved in the field of view, an embodiment of the selective device 1 will be shown which permits not only that the area can be moved within the field of view, but also that the configuration of the area can be varied in size.

Figures 3, 4:
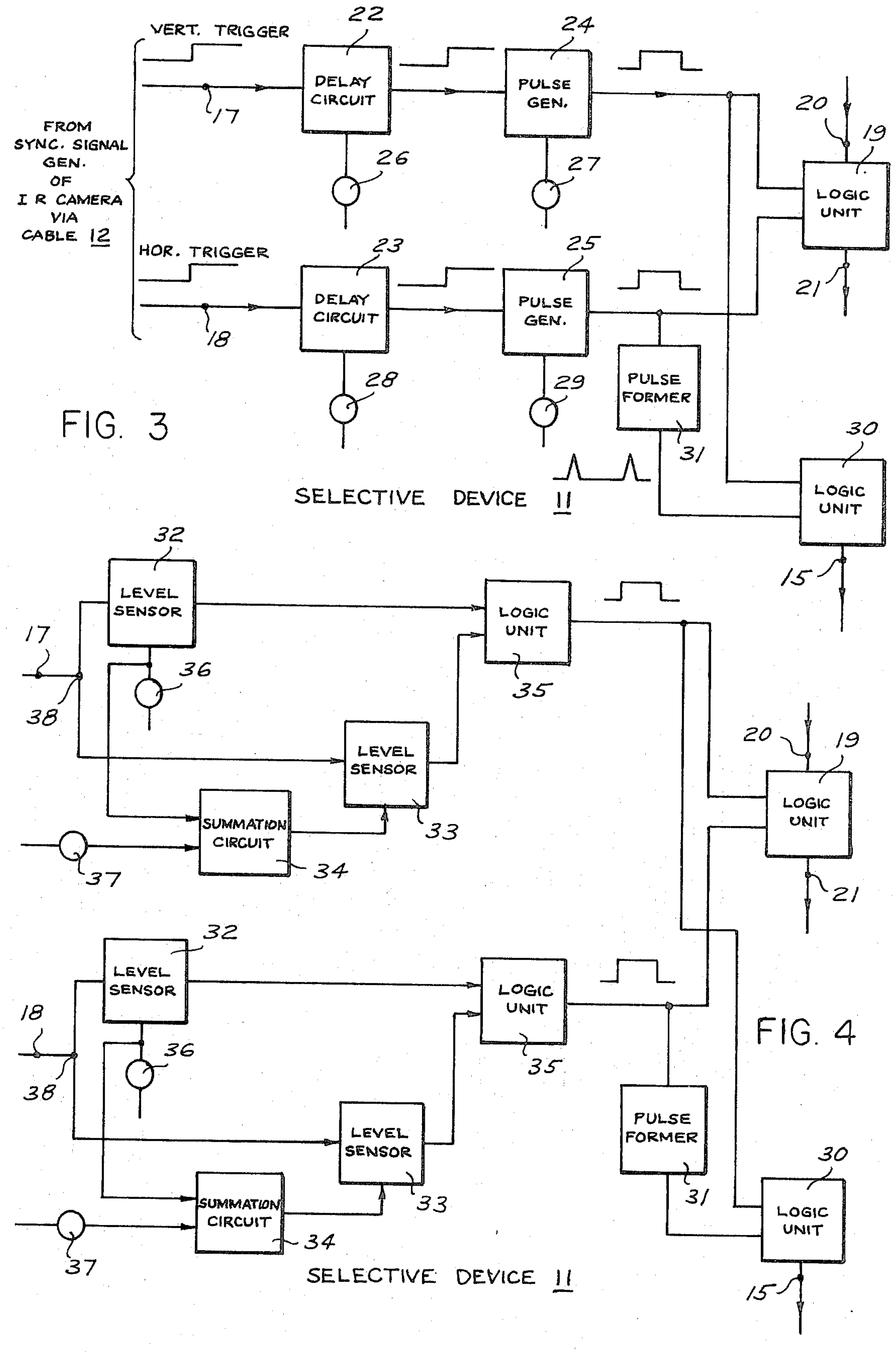
FIG. 3 shows schematically an embodiment of a selective device comprised in the device according to FIG. 2.
FIG. 4 shows schematically an embodiment of the selective device which differs from the one according to FIG. 3.

In FIG. 3, additional signals in the form of so-called trigger signals, vertically and horizontally, are received from the sync signal generator of the IR camera. These trigger signals can be emitted for instance at the beginning of each picture or line, respectively. The selective device contains a logic unit 19 (a coincidence circuit), over which the device is connected to a suitable place in the video channel via line 20, and to the signal-processing unit via line 21. The selective device also contains two branches, each of which contains a delay circuit 22 and 23 (one-shot multivibrators), respectively, and a pulse generator 24 and 25 one-shot multivibrators), respectively. In one of the branches, which via line 17 receives the trigger signals which control the vertical scanning in the scanning parts of the picture generating unit, a trigger signal of current interest is delayed in the delay circuit 22 for a time determined by a knob 26 which can be actuated manually to change the time constant of the multivibrator. The delayed trigger signal thereafter initiates the pulse generator 24 which, in turn, transmits a pulse of a certain duration, which pulse is finally fed into the logic part 19. By means of a knob 27 which can be actuated to vary the time constant, the duration of said pulse can also be varied. Thus, by means of the knob 26 it is possible to determine in the logic unit 19 where in the field of view the lower edge of an area should start in relation to the lower edge of the field of view, while the height of the area in the field of view can be selected with the knob 27.

In the other branch, which via line 18 receives the trigger signals which control the horizontal scanning in the scanning parts of the picture generating unit, in the corresponding way, a trigger signal of current interest is delayed in the delay circuit 23 for a time determined with a knob 28 which can be actuated manually. The trigger signal then delayed initiates the pulse generator 25 to transmit a pulse, the duration of which is determined with a knob 29, and which is thereafter fed into the logic unit 19. It is thereby determined in the logic part 19 by means of the knob 28 where in the field of view, usually counted from its left-hand edge, the area should start, while the knob 29 determines the lateral extent of the area.

It will thus be obvious that, by means of a suitable design of the logic unit, it is possible to indicate an area, the size and position of which in the field of view is determined by the knobs in question. The logic unit is then arranged in a known way i.e., line 20 is connected to line 21 so that the video signal is reproduced during the time one is within the area, i.e. as long as pulses are being received from both branches simultaneously, whereby it is possible to obtain information from the logic unit about the size of the first signal within the area. With certain limitations of the possibilities of selecting the configuration of the area, the functions of the knobs 26 and 28 can be combined in a first control member, and the same applies to the knobs 27 and 29, which can be combined in a second control member.

The selective device 11 also contains an additional logic unit 13 (a coincidence circuit), which is connected both to the pulse generator 24 and to the pulse generator 25, for scanning of the pulses transmitted from the generators. The additional logic part has an output for connection to the intensity controlling grid on the picture tube of the display device, which provides for indication in the picture of the area indicated by the selective device. In the example of the embodiment, the additional logic part 30 is connected to the pulse generator 25 via a pulse former circuit 31 of a known type, which contains a differentiator and a phase shifter. Because of the circuit 31, the area will be indicated on the picture tube through an increase of the intensity at the two vertical edges of the area. If the circuit 31 is omitted, the light intensity will be increased within the entire area on the picture.

In case the additional signals received via line 17 and 18 consist of vertical and horizontal sweep voltages, respectively, in the picture generating unit, said delay circuits 22 and 23, respectively, can be replaced by level sensing members such as Schmitt-trigger circuits, and the knobs 26 and 28 are then used for setting of the comparison level, with which the level sensing members are activated so that they transmit signals to the pulse generators 24 and 25.

When determining the extent of the area vertically and horizontally it is not necessary to use only pulse generators, and FIG. 4 is intended to show an example of such. In said figure, the delay circuits have thus been replaced by level sensing members 32 (Schmitt-trigger circuits), and the pulse generators with an additional level sensing member 33, a summation unit 34 (adder circuit) and a logic unit 35 coincidence circuit). In this case, the additional signals thus consist of vertical and horizontal sweep voltages, and are in the picture generating unit, and are received via lines 17 and 18, respectively, and since the two branches moreover are practically identical, only one of them will be described here, viz. the one that receives information about the scanning position vertically via line 17.

The determination in the logic unit 19 as to where in the field of view the area should start, counted from the upper or lower edge, is performed, as previously, with a knob 36, which in this case controls a first comparison level for which the level sensing member 32 is to transmit a signal. The extent of the area vertically is determined with a knob 37, which determines a voltage which in the summation device 34 is added to the level determined by the knob 36. The sum signal is fed to the additional level sensing member 33, and determines the comparison level for which this member, which is connected to the sweep signal of current interest at point 38 is to transmit a signal. A signal is thus received from the level sensing member 32 in the lower edge of the area, and from the additional level sensing member 33 at the upper edge of the area. These two signals are fed into the logic unit 35, which gives a signal when the scanning takes place vertically within the selected area. The extent of the area horizontally is determined in the corresponding way in the other branch, and the logic unit 19 functions in the same way as described above.

Embodiments of the selective device 11 other than those shown in FIGS. 3 and 4, as well as combinations of these, can also be used. Thus, for instance, the device can be made with counters in which the vertical position of the area is determined by a number of adjustable lines, for instance from the lower edge of the field of view, and the height of the area by determining the number of lines within the area. Moreover, the embodiments shown refer only to square or linear areas, but the concept of the invention is not limited to this. Thus, the area can also have other configurations, such as a spot, a triangle or combinations of these and those previously mentioned.

Figure 5:
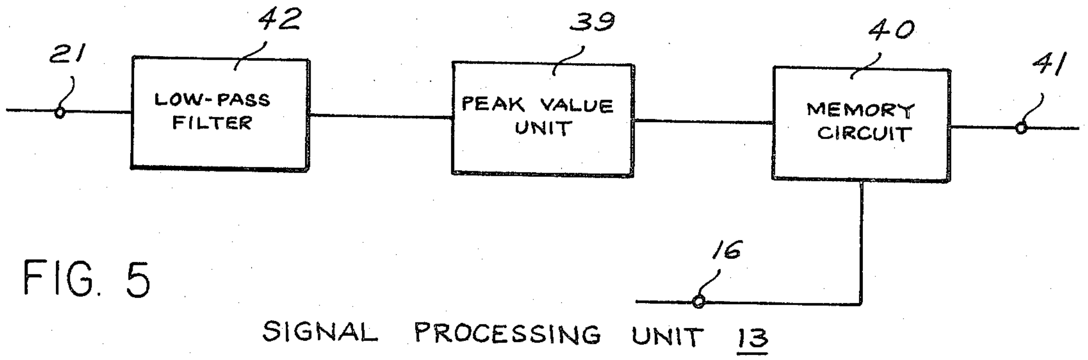
FIG. 5 shows schematically an example of a signal-processing unit.

As FIG. 5, the signal-processing unit can contain a peak value unit 39 (peak detector) which is connected to a following memory circuit 40, which in the most simple case can consist of an RC circuit. The first signal reproduced by the selective device is fed to the signal-processing unit via the connection point 21, and the signal which is transmitted from the RC circuit and which influences the black level in the picture is obtained via a connection point 41. The output signal will thus represent the warmest point within the area selected in the field of view. As the video signal also contains noise which varies more or less with the temperature, during each scanning, a varying value of the warmest point will be obtained. Thus it is not advisable to allow the output signal to adjust the black level for each picture, as in such a case a grey tone picture would be obtained which varies in synchronism with the noise. In cameras with a low noise level, the envisaged problem will be of lesser extent, but for cameras with a high noise level, special measures must be taken. It is then possible, for instance, to arrange so that, on command, measuring of the reproduced signal within the area will take place only during a predetermined number of scannings during a period of time, for instance during one scanning only, and that this value will be stored in a memory with a long memory time, i.e. that the RC circuit in FIG. 5 has a high time constant. When using an analogue memory, as in the case of the memory 40, the influence of the noise can be reduced through the insertion of a low-pass filter 42 before the peak value unit 39 in the signal-processing unit or between this unit and the selective unit.

Alternative embodiments of the signal-processing unit can comprise peak value units with following analogue-digital converters with a following digital memory, which gives the advantage of having extremely long memory times, so that measurements of the reproduced signal can take place with comparatively long intervals. As shown by FIG. 5, the memory 40 can be fed with a zero-setting signal via a connection point 43, which affords the possibility of setting the memory at zero, before each new measurement is made.

A signal corresponding to the range set in the grey tone picture should appropriately be subtracted from the output signal from the signal-processing part, which signal, as mentioned above, represents the warmest point and the highest voltage within the area selected.

Figure 6:
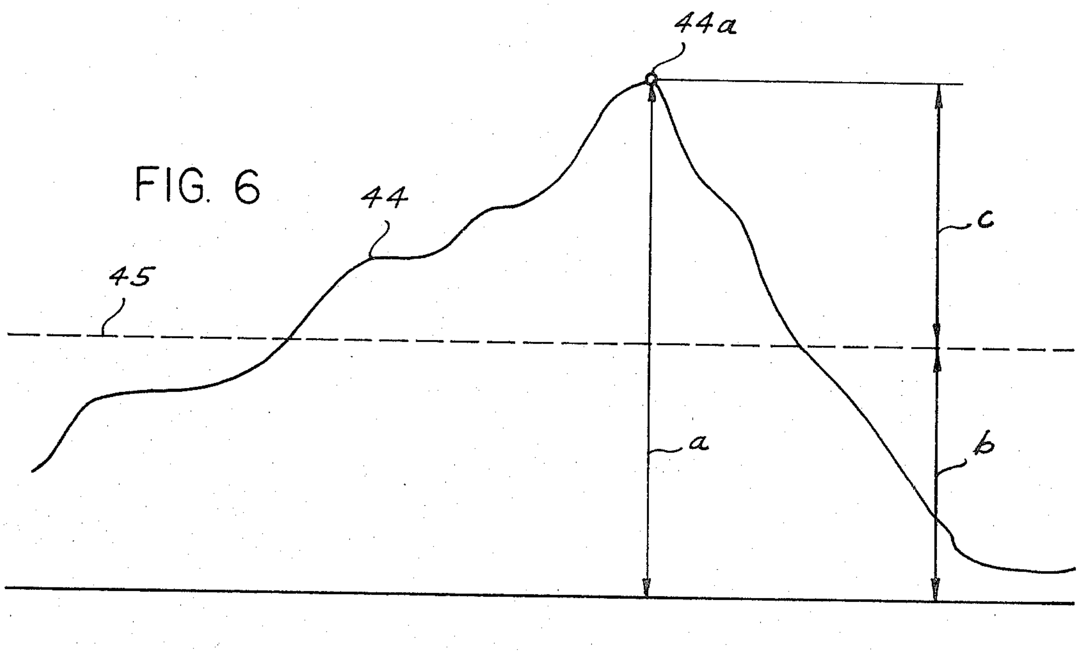
FIG. 6 shows a part of the video signal in the form of a waveform diagram.

In FIG. 6, which shows an example of a portion of a video signal 44, it has been assumed that the movable area is placed on the part 44*a* which represents the warmest point, and the signal transmitted from the signal-processing unit then has a value *a*. The black level

45 is determined by a signal having the value *b*, which is obtained from *a* by the subtraction of $a-c$, where *c* is the value of the signal corresponding to the range set in the grey tone picture.

Figure 7:
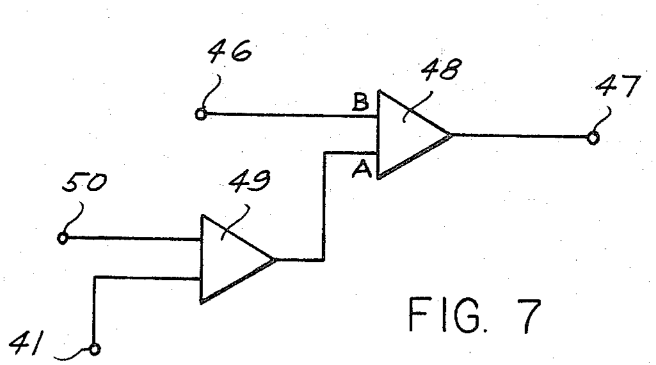
FIG. 7 shows schematically apparatus for controlling influences the video channel.

FIG. 7 shows how a subtracting device 48, (difference amplifier), is connected between two connection points 46 and 47 located at an appropriate place in the video channel, which subtracts signals for the black level which are received on input A, from the video signal on input B. The input A, in turn, is connected to an additional, also known subtracting device 49, which subtracts a signal corresponding to the range set at the connection point 50 from the output signal from the signal-processing unit via the connection point 41.

The IR cameras can also be provided with connection and disconnection devices for the automatic black level control, which makes it possible to use the manual black level controls of the cameras, and these can very well be applied separately in relation to the automatic controls or in combination with these.

For picture generating units which are provided with devices for inversion of the picture received and when these devices are connected, the member which according to the above-mentioned example determines the black level will instead determine an amplitude level in which the first signal is to be represented by white in the picture. The member in question will thereby be actuated by the output signal so that this determines the white level in the picture.

The invention is not limited to the embodiments described above, but can be subject to further modifications within the scope of the following claims. In said claims the phrase "threshold level" will be used to mean "black level" in normal video signal display or "white level" if the display process goes through an inversion.

I claim:

1. In combination with a scanning camera which generates scanning signals for controlling the scanning of a viewing field and generates amplitude modulated information signals related to the amplitude of the radiation at points within the viewing field, a video channel which receives the information signals and includes threshold establishing means for establishing a threshold level of signals transmitted therefrom, and a scanning display means for visually displaying the information signals transmitted from the video channel and being synchronized to said scanning camera by said scanning signals, apparatus for automatically controlling said establishing means to establish a threshold level related to the amplitude of the radiation at a particular area of the viewing field of the scanning camera comprising selective means receiving said scanning signals for generating selection signals occurring at particular times after the start of said scanning signals related to said particular area, sampling means responsive to the occurrence of said selection signals for sampling the information signals then being transmitted, means for generating a threshold control signal related to the amplitude of the sampled information signals and means for transmitting the threshold control signal to the threshold establishing means so that a threshold level for the entire viewing field is established which is dependent on the amplitude of the radiation in said particular area.

2. The apparatus of claim 1 wherein said selective means includes manually operable means for controllably selecting the duration of said selection signals.

3. The apparatus of claim 1 wherein said selective means includes manually operable means for controllably selecting the particular times when the selection signals occur.

4. The apparatus of claim 3 wherein said scanning signals are trigger pulses and said manually operable means includes delay means for delaying the transmission of said trigger pulses and means connected to said delay means and responsive to said trigger pulses for generating said selection signals.

5. The apparatus of claim 1 further comprising means for generating further information signals derived from said selection signnals and means for transmitting the further information signals to the scanning display means to demarcate on the visual display said particular area of the viewing field.

6. The apparatus of claim 5 wherein said means for generating further information signals generates signals such that peripheral portions of said particular area are demarcated.

7. The apparatus of claim 5 wherein said means for generating further information signals generates signals such that the entire particular area is demarcated.

8. The apparatus of claim 1 wherein said means for generating a threshold control signal includes a signal peak detector means for generating a signal related to the maximum radiation in said particular area.

9. The apparatus of claim 8 further comprising means for storing the signal generated by said signal peak detector means.

10. The apparatus of claim 8 further comprising means for filtering the signals transmitted to said signal peak detector means.

* * * * *